US 9,856,936 B2

(12) United States Patent
Masuda

(10) Patent No.: US 9,856,936 B2
(45) Date of Patent: Jan. 2, 2018

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 8 days.

(21) Appl. No.: 15/057,389

(22) Filed: Mar. 1, 2016

(65) Prior Publication Data

US 2016/0178021 A1    Jun. 23, 2016

Related U.S. Application Data

(63) Continuation of application No. PCT/JP2014/072908, filed on Sep. 1, 2014.

(30) Foreign Application Priority Data

Sep. 9, 2013 (JP) .................. 2013-186046

(51) Int. Cl.
*F16D 65/18* (2006.01)
*H02K 7/06* (2006.01)
(Continued)

(52) U.S. Cl.
CPC ............... *F16D 65/18* (2013.01); *B60L 7/00* (2013.01); *H02K 7/06* (2013.01); *H02P 3/18* (2013.01);
(Continued)

(58) Field of Classification Search
CPC ............. F16D 2125/52; F16D 2125/48; F16D 2125/40; F16D 2121/24; F16D 65/18;
(Continued)

(56) References Cited

U.S. PATENT DOCUMENTS 4,568,863 A    2/1986 Ruof
5,021,724 A    6/1991 Hirano et al.
(Continued)

FOREIGN PATENT DOCUMENTS

CN    102565783 A    7/2012
DE    10234848       2/2004
(Continued)

OTHER PUBLICATIONS

International Preliminary Report on Patentability dated Mar. 24, 2016 in corresponding International Patent Application No. PCT/JP2014/072908.
(Continued)

*Primary Examiner* — Melanie Torres Williams

(57) ABSTRACT

An electric brake device includes a brake rotor; a brake pad; an electric motor; a linear motion mechanism configured to convert a rotary motion of the electric motor into a linear motion so as to be transmitted to the brake pad; a controller to control the electric motor; and a brake command device to send a braking force command to the controller. The controller includes an emergency braking detector to detect an emergency braking request; a steady state controller to perform braking in a steady state; and a flux weakening controller to perform flux weakening control. The flux weakening control is performed when the emergency braking detector detects an emergency braking request.

8 Claims, 7 Drawing Sheets

(51) Int. Cl.
*B60L 7/00* (2006.01)
*H02P 3/18* (2006.01)
*H02P 6/08* (2016.01)
*H02P 23/00* (2016.01)
*F16D 121/24* (2012.01)
*F16D 125/40* (2012.01)
*F16D 125/48* (2012.01)
*F16D 125/52* (2012.01)

(52) U.S. Cl.
CPC ............. *H02P 6/08* (2013.01); *H02P 23/009* (2013.01); *F16D 2121/24* (2013.01); *F16D 2125/40* (2013.01); *F16D 2125/48* (2013.01); *F16D 2125/52* (2013.01); *Y02T 10/641* (2013.01); *Y02T 10/642* (2013.01)

(58) Field of Classification Search
CPC ........... Y02T 10/642; B60L 7/00; H02K 7/06; H02P 3/18; H02P 6/08; H02P 23/009
See application file for complete search history.

(56) References Cited

U.S. PATENT DOCUMENTS

| | | | |
|---|---|---|---|
| 7,810,616 | B2 | 10/2010 | Nakazeki |
| 8,896,244 | B2 | 11/2014 | Kleinau |
| 2008/0110704 | A1 | 5/2008 | Nakazeki |
| 2008/0179941 | A1* | 7/2008 | Matsushita ........... B60T 8/3275 303/20 |
| 2010/0320043 | A1* | 12/2010 | Yamasaki ............... F16D 65/18 188/162 |
| 2012/0101704 | A1* | 4/2012 | Wagner .................. G01S 7/003 701/96 |
| 2013/0154524 | A1 | 6/2013 | Kleinau |

FOREIGN PATENT DOCUMENTS

| | | |
|---|---|---|
| EP | 2604466 | 6/2013 |
| JP | 03-169291 | 7/1991 |
| JP | 6-206527 | 7/1994 |
| JP | 2000-203402 | 7/2000 |
| JP | 2002-67907 | 3/2002 |
| JP | 2002-171796 | 6/2002 |
| JP | 2003-343620 | 12/2003 |
| JP | 2006-194356 | 7/2006 |
| JP | 2012-131293 | 7/2012 |

OTHER PUBLICATIONS

International Search Report dated Dec. 2, 2014, in corresponding International Application No. PCT/JP2014/072908.
Chinese Office Action dated Jun. 22, 2017 in related Chinese Application No. 201480049205.7.
Extended European Search Report dated May 22, 2017, in corresponding European Patent Application No. 14842713.1.
Japanese Office Action dated May 23, 2017, in corresponding Japanese Patent application No. 2013-186046.

* cited by examiner

ELECTRIC BRAKE DEVICE

CROSS REFERENCE TO THE RELATED APPLICATION

This application is a continuation application, under 35 U.S.C. §111(a), of international application No. PCT/JP2014/072908, filed Sep. 1, 2014, which claims Convention priority to Japanese patent application No. 2013-186046, filed Sep. 9, 2013, the entire disclosure of which is herein incorporated by reference as a part of this application.

BACKGROUND OF THE INVENTION (Field of the Invention)

The present invention relates to electric brake devices that convert a rotary motion of electric motors into a linear motion through linear motion mechanisms, and press brake pads against disc rotors.

(Description of Related Art)

To date, as an electric brake or a controller for electric motors, the following has been proposed.
1. An electric disc brake that converts, by application of a brake pedal, a rotary motion of an electric motor into a linear motion through a linear motion mechanism, and causes a pressing force at a press member of a friction pad, thereby pressing the friction pad against a disc rotor, to perform braking (Patent Document 1).
2. A linear actuator in which a planetary roller screw mechanism is used (Patent Document 2).
3. A method for controlling d-axis current and q-axis current of a motor (Patent Document 3).

RELATED DOCUMENT

Patent Document

[Patent Document 1] JP Laid-open Patent Publication No. 2003-343620
[Patent Document 2] JP Laid-open Patent Publication No. 2006-194356
[Patent Document 3] JP Laid-open Patent Publication No. H3-169291

In order to improve responsiveness in such electric brake devices as described in Patent Documents 1 and 2, it is effective to perform flux weakening control for an electric motor. However, there is a problem that frequent use of flux weakening control could lead to increase in power consumption.

As described in Patent Document 3, the d-axis and q-axis currents are determined for an electric motor by the specification of the power supply and the load state of the motor. However, for example, in the case where an electric motor is incorporated in an electric brake device to be used, quick response is required at the time of emergency braking, whereas reduction in power consumption is important at the time of normal and moderate braking. Thus, output characteristics required for an electric motor vary depending on the state.

SUMMARY OF THE INVENTION

An object of the present invention is to provide an electric brake device that can suppress increase in power consumption and that can improve responsiveness.

Hereinafter, in order to facilitate the understanding, the present invention will be described with reference to the reference numerals used in embodiments for convenience sake.

An electric brake device of the present invention includes: a brake rotor 6; a brake pad 7; an electric motor 2; a linear motion mechanism 4 configured to convert a rotary motion of the electric motor 2 into a linear motion that is transmitted to the brake pad 7; a controller 9 configured to control the electric motor 2; and a brake command device 40 configured to send a braking force command to the controller 9, wherein
the controller 9 includes:
an emergency braking detection module 41 configured to detect an emergency braking request;
a steady state control section 46 configured to perform braking in a steady state; and
a flux weakening control module 42 configured to perform flux weakening control, the flux weakening control being performed when the emergency braking detection module 41 detects an emergency braking request.

The braking force command may include a stroke amount of a brake pedal 32.

According to this configuration, the controller 9 performs drive control on the electric motor 2 such that the brake pad 7 having a predetermined clearance from the brake rotor 6, is pressed against the brake rotor 6 when the value of the braking force command from the brake command device 40 increases. When the emergency braking detection module 41 detects an emergency braking request, the flux weakening control module 42 of the controller 9 applies, for example, a d-axis current to the electric motor 2 to perform flux weakening control, thereby increasing the rotational frequency of the electric motor 2 to enhance the followability to the braking force command.

In general, an appropriate pair of values of d-axis and q-axis currents differs according to which is emphasized, power or efficiency. In particular, in the case where an electric motor in which a permanent magnet is provided on the surface of the rotor, d-axis current fails to generate the torqued, that is, d-axis current makes only copper loss. Thus, in the case where efficiency is emphasized, it is preferable that the value of the d-axis current is set to zero.

In the present invention, the motor current can be controlled such that the maximum output is achieved only when the emergency braking detection module 41 has detected an emergency braking request, and thus, responsiveness can be improved. If no emergency braking request is detected, the motor current is controlled under a current condition as efficient as possible, whereby power consumption during steady operation can be reduced.

The electric brake device may further include a braking force estimation module 43 configured to estimate the braking force. Respective threshold(s) is/are determined for at least one of: an input value from the brake command device 40, a differential value of the input value, a deviation between the input value from the brake command device 40 and the braking force estimated by the braking force estimation module 43, and a differential value of the deviation. The emergency braking detection module 41 may detect the emergency braking request through comparison between the value and the respective threshold therefor.

The threshold is determined, for example, through a test with an actual vehicle, simulation, or the like.

In this case, for example, when the differential value of the input value from the brake command device 40 exceeds the threshold, the flux weakening control module 42 applies a d-axis current to the electric motor 2 to perform flux weakening control, thereby increasing the rotational frequency of the electric motor 2 to enhance the followability to the braking force command. Using the differential value allows compensation operation that applies a strong braking force when an emergency braking request is detected, even if the force applied on the brake pedal 32 is insufficient, for example. In the case where a threshold is used for the input value itself from the brake command device 40, the electric brake device is less likely to be subjected to influence such as noise, and thus, configuration and logic therefor are easy.

A vehicle 47 having the electric brake device mounted therein may include a distance detection device 49 configured to detect a distance between the vehicle and an obstacle outside the vehicle. The emergency braking detection module 41 may detect the emergency braking request based on the distance detected by the distance detection device 49 or a differential value of the distance. In this case, for example, in a state where the relative distance between the vehicle 47 and the obstacle outside the vehicle or the differential value thereof becomes less than or equal to a certain value, when the brake command device 40 sends a braking force command to the controller, the emergency braking detection module 41 can determine an emergency braking state.

The flux weakening control module 42 may include: an emergency braking level estimation section 42a configured to estimate a level of an emergency braking state, the level being estimated when the emergency braking request is detected; and a current limitation section 42b configured to determine an upper limit value for a d-axis current to be used in the flux weakening control, depending on the level of the emergency braking state estimated by the emergency braking level estimation section 42a. In this manner, by determining the upper limit value for the d-axis current to be used in the flux weakening control depending on the level of the emergency braking state, it is possible to finely control the output of the electric motor 2.

The electric brake device may further include: a braking force estimation module 43 configured to estimate the braking force. The controller 9 may include an emergency braking request cancellation module 44 configured to cancel the emergency braking request, the emergency braking request being cancelled when a deviation between an input value from the brake command device 40 and an estimated braking force value estimated by the braking force estimation module 43 becomes less than or equal to a certain value. In this case, since the emergency braking request can be canceled without delay, power consumption during steady operation can be further reduced.

When the emergency braking request is detected, the flux weakening control module 42 may temporarily make greater an upper limit value for a current to be applied to the electric motor 2, than that in the steady state where no emergency braking request is detected. In this case, a braking force larger than that in the steady state can be applied at the time of an emergency braking request, and thus, the braking distance can be shortened.

The electric brake device may further include a power supply monitoring section 50 configured to measure a remaining amount of power of a power supply that drives the electric motor 2. The flux weakening control module 42 limits a d-axis current to be used in the flux weakening control when the remaining amount of power measured by the power supply monitoring section 50 becomes less than or equal to a threshold. By limiting the d-axis current to be used in the flux weakening control under the condition where the power remaining amount of the power supply 36 is less than or equal to the threshold, that is, just before the power supply is exhausted, it is possible to delay further consumption of the power supply.

When the emergency braking request is detected, the flux weakening control module 42 may determine a value of the command for emergency braking so as to be greater than a value of the command from the brake command device 40 as a command value. By increasing the value of the command from the brake command device 40 when an emergency braking request is detected, a braking force larger than that in the steady state can be easily applied.

The electric motor 2 may be a surface permanent magnet brushless DC motor. Alternatively, the electric motor 2 may be an interior permanent magnet motor.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
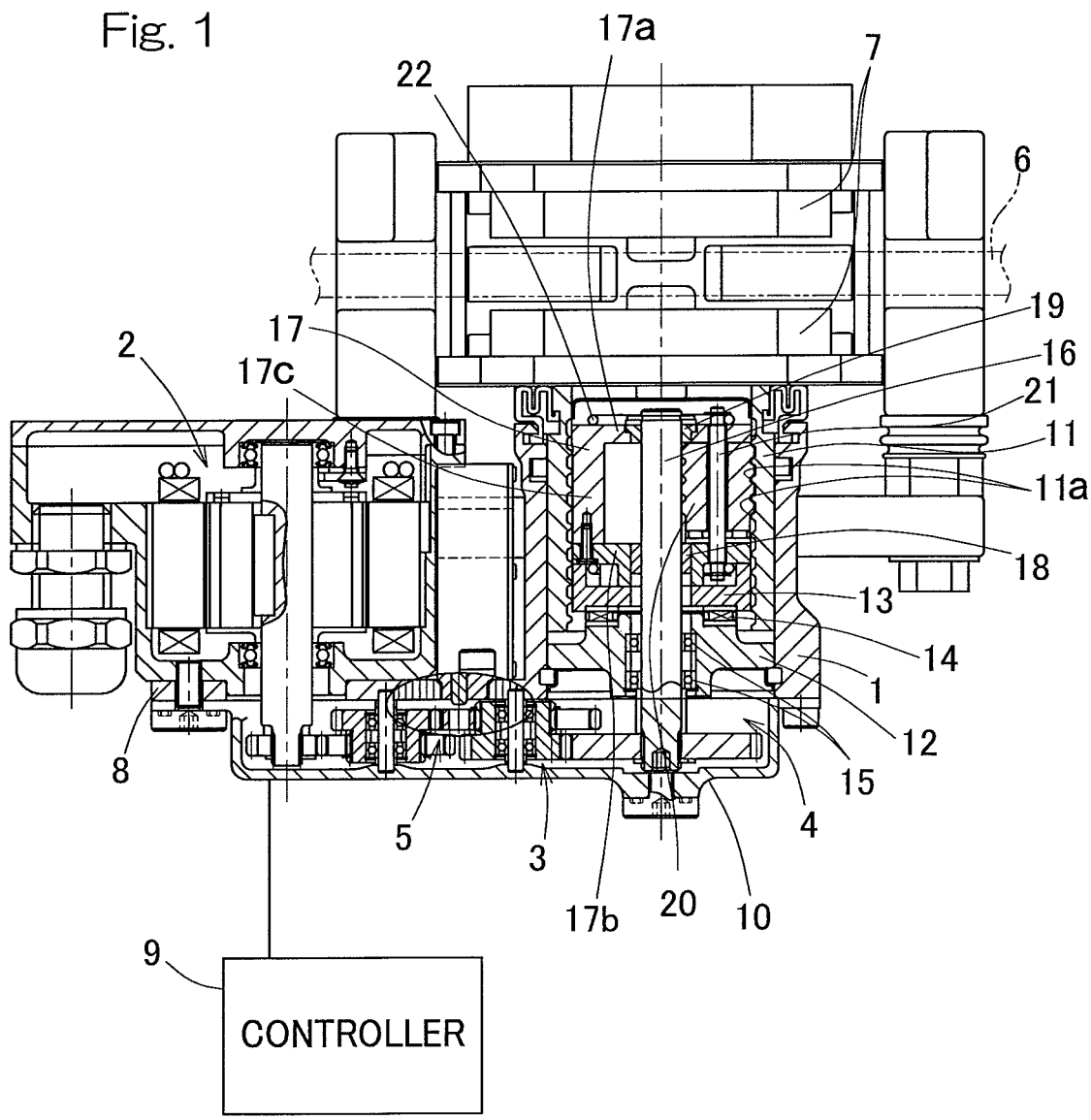
FIG. 1 is a cross-sectional view of an electric brake device according to a first embodiment of the present invention.
Figure 2:
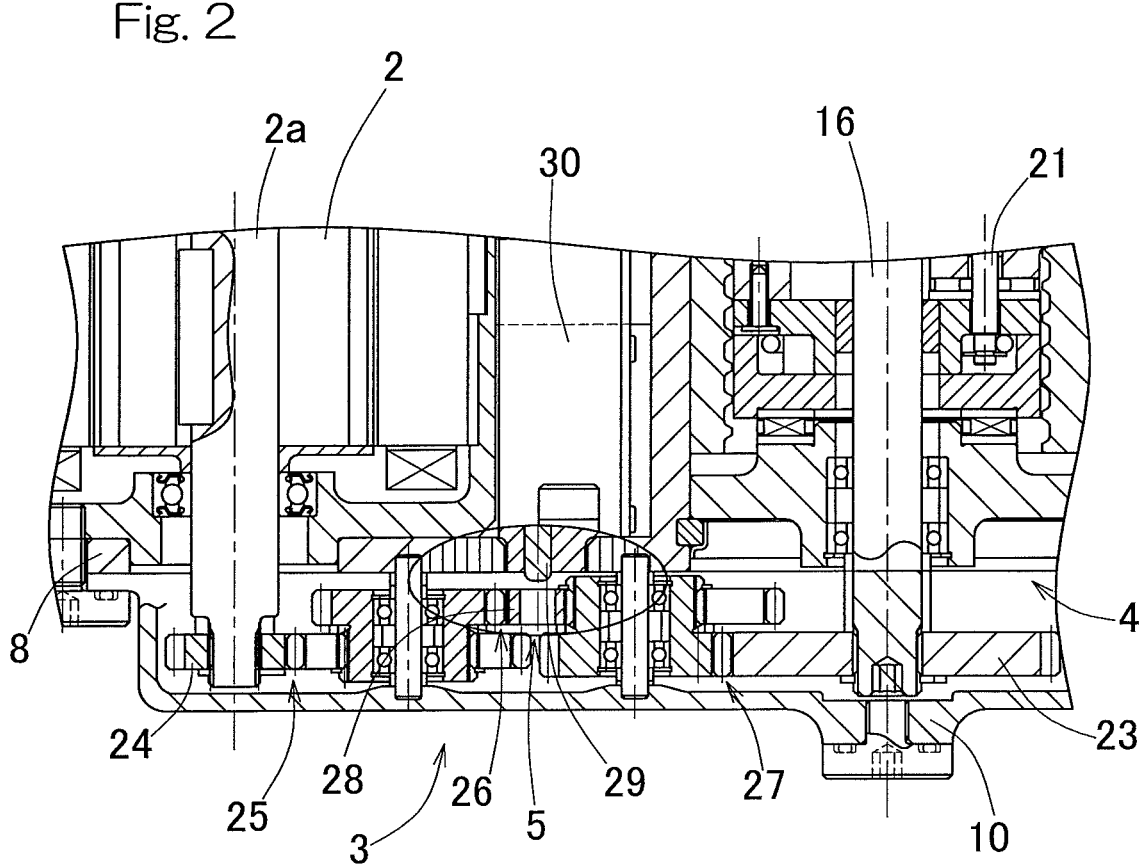
FIG. 2 is an enlarged cross-sectional view around a speed reduction mechanism of the electric brake device.
Figure 3:
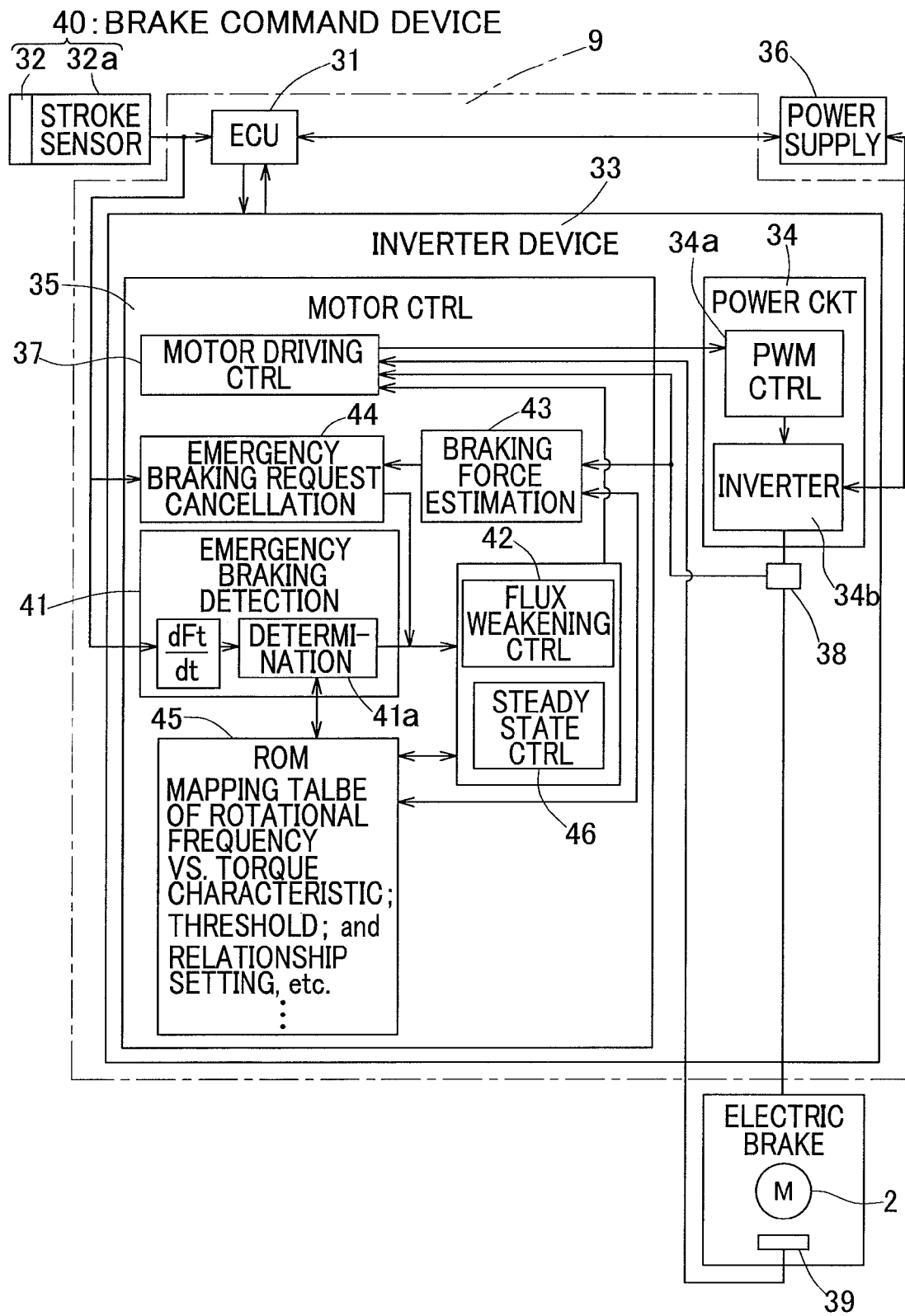
FIG. 3 is a block diagram of a control system of the electric brake device.

An electric brake device according to a first embodiment of the present invention will be described with reference to FIGS. 1 to 6. As shown in FIG. 1, the electric brake device includes: a housing 1; an electric motor 2; a speed reduction mechanism 3 configured to reduce a speed of rotation of the electric motor 2; a linear motion mechanism 4; a locking mechanism 5; a brake rotor 6; a brake pad 7; and a controller 9 (FIG. 3). A base plate 8 is provided at an opening end of the housing 1 so as to extend radially outward, and the electric motor 2 is supported by the base plate 8. The linear motion mechanism 4 is incorporated into the housing 1 so as to apply a braking force to the brake rotor 6, in this example, to a disc rotor 6 by output from the electric motor 2. The opening end of the housing 1 and an outer side surface of the base plate 8 are covered by a cover 10.

The linear motion mechanism 4 will be described. The linear motion mechanism 4 is a mechanism that converts a rotary motion outputted from the speed reduction mechanism 3 into a linear motion and brings the brake pad 7 into contact with the brake rotor 6 or separates the brake pad 7 from the brake rotor 6. The linear motion mechanism 4 includes a slide member 11, a bearing member 12, an annular thrust plate 13, a thrust bearing 14, rolling bearings 15, 15, a rotation shaft 16, a carrier 17, and slide bearings 18, 19. The cylindrical slide member 11 is supported on the inner circumferential surface of the housing 1 such that the slide member 11 is prevented from rotating and is movable in the axial direction. On the inner circumferential surface of the slide member 11, a helical projection 11a is helically formed so as to project by a predetermined distance in the radially inward direction. A plurality of planetary rollers 20 described below mesh with the helical projection 11a.

The bearing member 12 is provided at one end side, in the axial direction, of the slide member 11 in the housing 1. The bearing member 12 includes: a flange portion that extends radially outward; and a boss portion. The rolling bearings 15, 15 are fitted in the boss portion, and the rotation shaft 16 is fitted into the inner diameter surface of an inner ring of each of the bearings 15, 15. Therefore, the rotation shaft 16 is rotatably supported by the bearing member 12 through the bearings 15, 15.

The carrier 17 is provided on the inner circumference of the slide member 11 so as to be rotatable about the rotation shaft 16. The carrier 17 has disks 17a, 17b that oppose each other in the axial direction. The disk 17b on the bearing member 12 side may be referred to as an inner disk 17b, and the disk 17a may be referred to as an outer disk 17a. A distance adjustment member 17c is provided, in the disk 17a that is one of the disks, on the side surface opposing the disk 17b that is the other of the disks, so as to project in the axial direction from the outer circumferential edge portion of the side surface. A plurality of the distance adjustment members 17c are arranged so as to be spaced from each other in the circumferential direction such that distances between the plurality of planetary rollers 20 are adjusted. Both the disks 17a and 17b are integrated with each other through the distance adjustment members 17c.

The inner disk 17b is supported by the slide bearing 18 that is fitted between the inner disk 17b and the rotation shaft 16 so as to be movable in the axial direction and rotatable. The outer disk 17a has a shaft insertion hole formed at the center thereof and the slide bearing 19 is fitted into the shaft insertion hole. The outer disk 17a is rotatably supported through the slide bearing 19 by the rotation shaft 16. A washer for receiving thrust load is fitted to the end portion of the rotation shaft 16, and a retaining ring that prevents the washer from being removed is provided.

The carrier 17 has a plurality of roller shafts 21 spaced from each other in the circumferential direction. Both end portions of each roller shaft 21 are supported by and between the disks 17a and 17b. That is, each of the disks 17a and 17b has a plurality of shaft insertion holes that are formed as long holes, and both the end portions of each roller shaft 21 are inserted into the corresponding shaft insertion holes, whereby the roller shafts 21 are supported so as to be movable in the radial direction. An elastic ring 22 is extended over the plurality of roller shafts 21 so as to urge the roller shafts 21 in the radially inward direction.

The planetary rollers 20 are rotatably supported by the roller shafts 21, respectively, and each planetary roller 20 is disposed between the outer circumferential surface of the rotation shaft 16 and the inner circumferential surface of the slide member 11. Each planetary roller 20 is pressed against the outer circumferential surface of the rotation shaft 16 by urging force of the elastic ring 22 extended over the plurality of roller shafts 21. By rotation of the rotation shaft 16, each planetary roller 20 that is in contact with the outer circumferential surface of the rotation shaft 16 rotates due to contact friction. On the outer circumferential surface of each planetary roller 20, a helical groove is formed so as to mesh with the helical projection 11a of the slide member 11.

A washer and a thrust bearing (both of which are not shown) are disposed between the inner disk 17b of the carrier 17 and one end portion, in the axial direction, of each planetary roller 20. In the housing 1, the annular thrust plate 13 and the thrust bearing 14 are disposed between the inner disk 17b and the bearing member 12.

The speed reduction mechanism 3 will be described. As shown in FIG. 2, the speed reduction mechanism 3 is a mechanism that reduces a speed of rotation of the electric motor 2 and transmits the reduced rotation to an output gear 23 fixed to the rotation shaft 16, and the speed reduction mechanism 3 includes a plurality of gear trains. In this example, the speed reduction mechanism 3 sequentially reduces, by gear trains 25, 26, and 27, a speed of rotation of an input gear 24 mounted to a rotor shaft 2a of the electric motor 2, and allows the rotation to be transmitted to the output gear 23 fixed to the end portion of the rotation shaft 16.

The locking mechanism 5 will be described. The locking mechanism 5 is configured to switch between: a locking state in which a braking force reducing operation of the linear motion mechanism 4 is inhibited; and an unlocking state in which the braking force reducing operation is allowed. The locking mechanism 5 is provided in the speed reduction mechanism 3. The locking mechanism 5 has: a casing (not shown); a lock pin 29; a bias mechanism (not shown) that biases the lock pin 29 so as to be in the unlocking state; and a linear solenoid 30 that acts as an actuator for driving switching of the lock pin 29. The casing is supported by the base plate 8, and the base plate 8 has a pin hole through which the lock pin 29 is allowed to move forward and backward.

The locking state is obtained when the lock pin 29 is moved forward by the linear solenoid 30, and engaged into a locking hole (not shown) formed in an intermediate gear 28 on the output side of the gear train 26, to prevent rotation of the intermediate gear 28. Meanwhile, by the linear solenoid 30 being made off, the lock pin 29 is retracted in the casing so as to be removed from the locking hole by the bias force from the bias mechanism, to allow rotation of the intermediate gear 28, whereby the locking mechanism 5 enters the unlocking state.

FIG. 3 is a block diagram illustrating a control system of the electric brake device. As shown in FIG. 3, a vehicle having the electric brake device mounted therein includes an ECU 31 that is an electric control unit that controls the entirety of the vehicle. The ECU 31 generates a speed reduction command in accordance with an output from a brake command device 40. The brake command device 40 includes: a brake pedal 32; and a stroke sensor 32a that detects the stroke, which depends on the amount of operation (stroke amount) of the brake pedal 32. An inverter device 33 is connected to the ECU 31, and the inverter device 33 includes: a power circuit section 34 provided for each electric motor 2; and a motor control unit 35 that controls the power circuit section 34.

The motor control unit 35 includes a computer, a program executed by the computer, and an electronic circuit. The motor control unit 35 converts, in accordance with a speed reduction command received from the ECU 31, the speed reduction command into a current command, and sends the current command to a PWM control section 34a of the power circuit section 34. The motor control unit 35 has a function of outputting, to the ECU 31, various information such as detected values and control values concerning the electric motor 2.

The power circuit section 34 has: an inverter 34b that converts DC power from a power supply 36 into three-phase AC power used for driving the electric motor 2; and the PWM control section 34a that controls the inverter 34b. The electric motor 2 may include a surface-magnet-type motor in which a magnet is provided on the surface of the rotor, i.e., a so-called SPM (Surface Permanent Magnet Motor), and is formed as a three-phase synchronous motor. The inverter 34b is formed by a plurality of semiconductor switching elements (not shown), and the PWM control section 34a performs pulse width modulation of the inputted current command to send an on/off command to each semiconductor switching element.

The motor control unit 35 has a motor driving control section 37 as its basic control section. The motor driving control section 37 converts, in accordance with a speed reduction command indicated by a torque command received from the ECU 31 that is a higher-order or master control unit, the speed reduction command into a current command, and sends the current command to the PWM control section 34a of the power circuit section 34. The motor driving control section 37 obtains, from a current detection device 38, a value of a motor current that flows from the inverter 34b to the electric motor 2 to perform current feedback control. Further, the motor driving control section 37 obtains a rotation angle of a rotor of the electric motor 2 from a rotation angle sensor 39, and sends a current command to the PWM control section 34a so as to enable efficient motor driving according to the rotor rotation angle.

In this embodiment, the motor control unit 35 above described includes an emergency braking detection module 41, a flux weakening control module 42, a braking force estimation module 43, and an emergency braking request cancellation module 44. The emergency braking detection module 41 is configured to detect an emergency braking request and includes a determination section 41a. In this example, the emergency braking detection module 41 holds a threshold for a differential value dFT/dt of an input value from the brake command device 40. When the determination section 41a determines that the dFT/dt has exceeded the threshold, the emergency braking detection module 41 detects an emergency braking request. The motor control unit 35 includes a storage unit 45 such as a ROM, and the storage unit 45 is electrically connected to each component in the inverter device. The threshold is stored in the storage unit 45 in a rewritable manner. The threshold may be determined through a test with an actual vehicle or simulation.

When the emergency braking detection module 41 detects an emergency braking request, the flux weakening control module 42 is activated so that flux weakening control is performed by applying a d-axis current to the electric motor 2. Accordingly, it is possible to increase the rotational frequency of the electric motor 2 to enhance the followability to the braking force command. When the emergency braking detection module 41 detects no emergency braking request, that is, when the determination section 41a determines that the dFT/dt has not exceeded the threshold, a steady state control section 46 is activated instead of the flux weakening control module 42. The steady state control section 46 controls the motor current under an efficient current condition that makes the d-axis current zero, for example. Accordingly, power consumption during steady operation can be reduced.

The d-axis and q-axis currents of the electric motor 2 in the emergency braking state where the emergency braking request is detected may be determined based on a mapping table of rotational frequency vs. torque characteristic in which the relationship between the rotational frequency and the torque of the electric motor 2 is defined. In the storage unit 45, a desired mapping table of rotational frequency vs. torque characteristic for the emergency braking state is stored. The mapping table of rotational frequency vs. torque characteristic may be defined through a test with an actual vehicle or simulation.

The braking force estimation module 43 estimates a real braking force ("actual braking force") based on the current detected by the current detection device 38, for example. The storage unit 45 stores a table in which the relationship between the actual braking force and the current flowing in the electric motor 2 is defined. The braking force estimation module 43 estimates the actual braking force by looking up the detected current value on the table in which the relationship is defined.

When the deviation between the input value from the brake command device 40 and an estimated braking force value estimated by the braking force estimation module 43 becomes less than or equal to a certain value, the emergency braking request cancellation module 44 cancels or invalidates the emergency braking request. This is because, if the deviation between the input value from the brake command device 40 and the estimated braking force value is less than or equal to the certain value, it can be considered that the speed reduction is not caused by emergency braking but by normal breaking. Accordingly, the flux weakening control module 42 is replaced by the steady state control section 46, and then, the steady state control section 46 controls the motor current.

Figure 4:
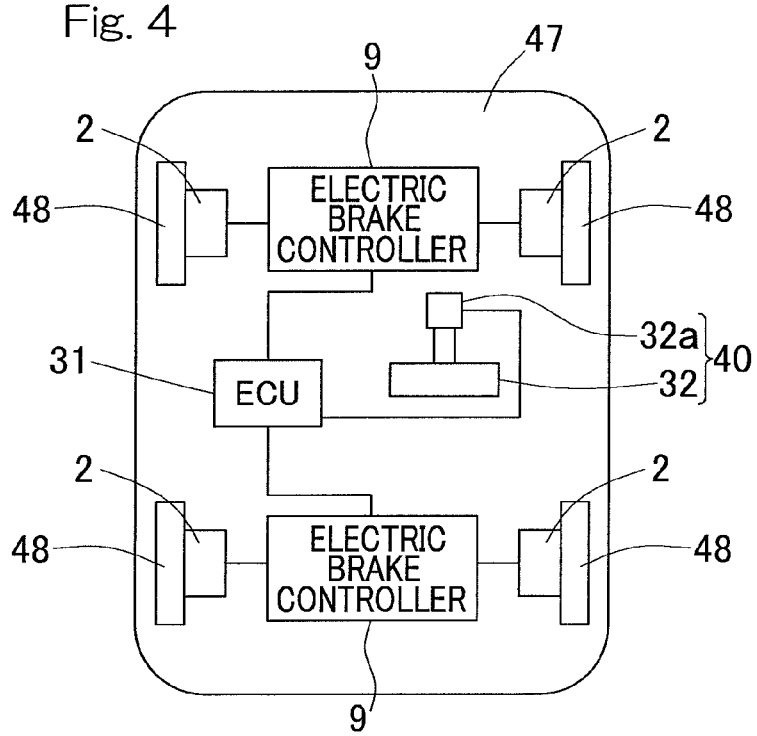
FIG. 4 is a schematic diagram showing the electric brake device mounted in a vehicle.

FIG. 4 is a schematic diagram showing an example in which the electric brake device is mounted on a four-wheeled vehicle 47. As shown in FIG. 4, the electric motor 2 is provided to each wheel 48. Each electric motor 2 is drive-controlled so as to press the brake pad 7 (FIG. 1) against the corresponding brake rotor 6 (FIG. 1) in the associated wheel 48. This embodiment shows an example in which the brake pedal 32 and the stroke sensor 32a which measures the stroke amount of the brake pedal 32 are used as the brake command device 40. However, the present invention is not limited to this example. Another example will be described later.

Figure 5:
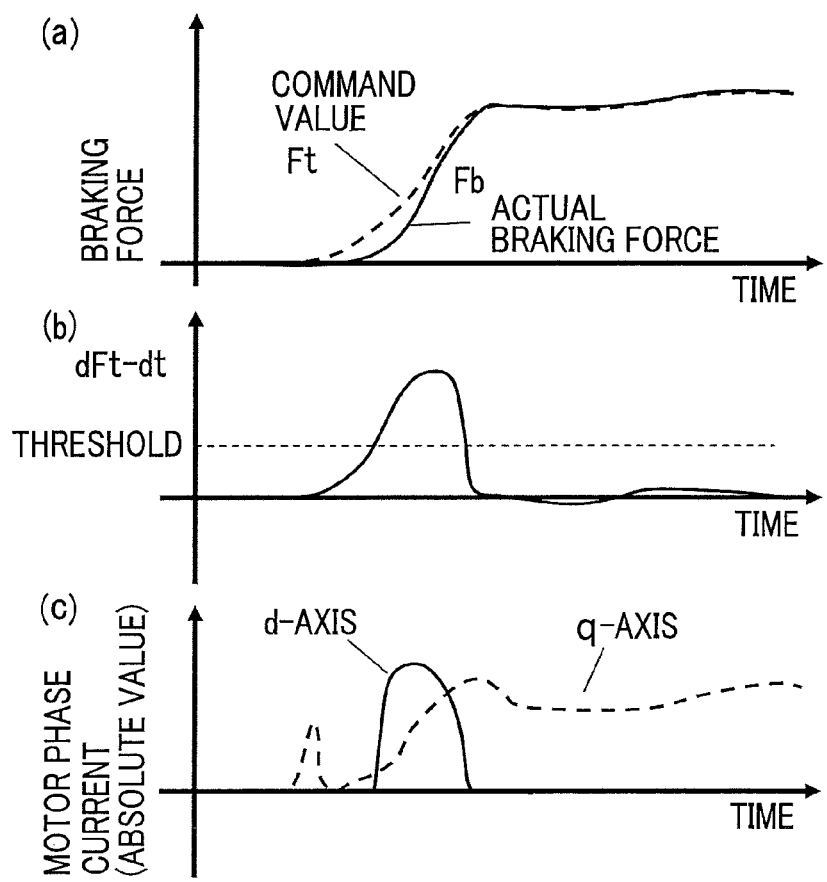
FIG. 5 shows the outline of flux weakening control performed in the electric brake device.

FIG. 5 shows the outline of the flux weakening control performed in the electric brake device. Graph (a) of FIG. 5 shows how the value FT of the braking force command and the actual braking force Fb over time. Graph (b) of FIG. 5 shows the differential value dFT/dt of the value FT of the braking force command shown in graph (a) of FIG. 5. Graph (c) of FIG. 5 shows d-axis and q-axis currents of the electric motor. As shown in graph (b) of FIG. 5, when the differential value dFT/dt of the value FT of the braking force command exceeds the threshold, the d-axis current is applied to the electric motor as shown in graph (c) of FIG. 5, to perform flux weakening control, thereby increasing the rotational frequency of the electric motor to enhance the followability to the braking force command FT. At this time, the d-axis and q-axis currents may be determined in advance, based on the upper limit value for current to be applied to the electric motor, and the output characteristics of the rotational frequency and the torque of the electric motor which are defined in the mapping table of rotational frequency vs. torque characteristic (FIG. 3).

Figure 6:
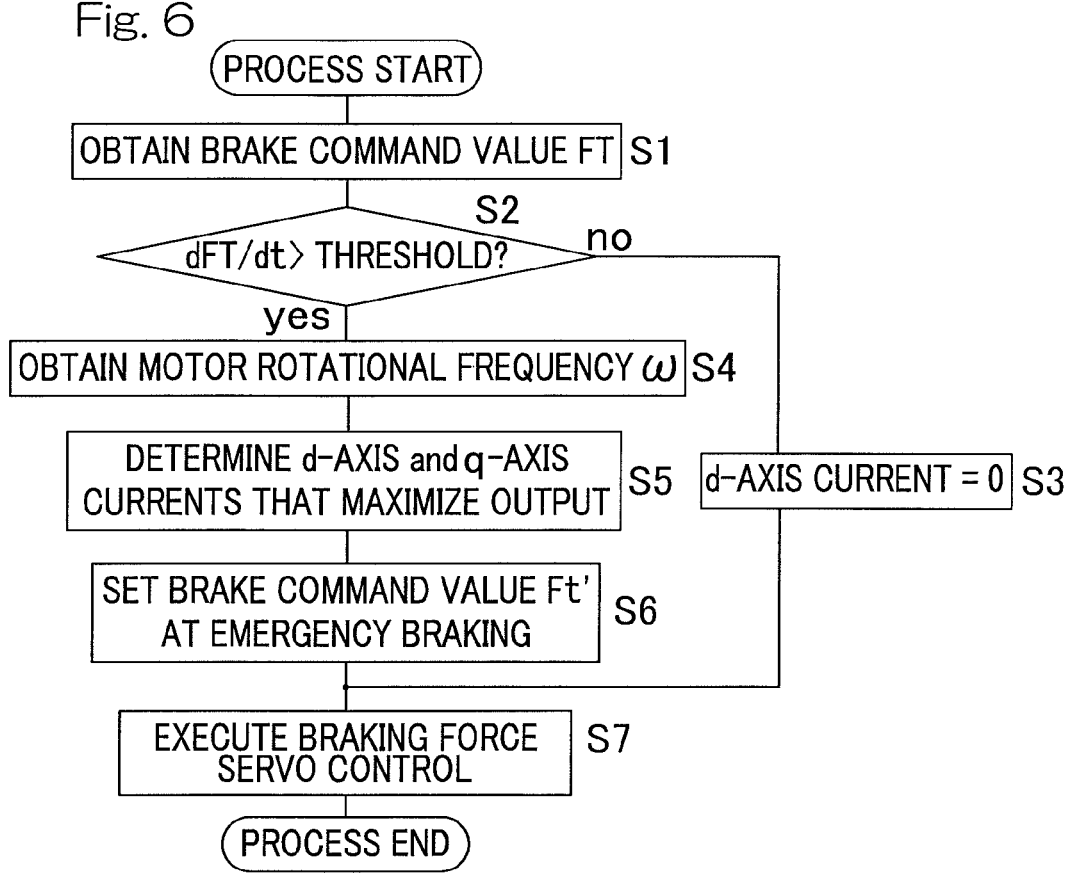
FIG. 6 is a flow chart stepwise showing a method for controlling the electric brake device.

FIG. 6 is a flow chart showing a method for controlling the electric brake device step by step. The following explanation will be made also with reference to FIG. 3. This calculation process is started during operation of a vehicle, and the emergency braking detection module 41 obtains a braking force command (step S1). Next, in step S2, the determination section 41a determines whether dFT/dt has exceeded the threshold. When the determination section 41a has determined that dFT/dt has not exceeded the threshold (step S2: no), the steady state control section 46 sets the d-axis current to zero so as to control the motor current only based on the q-axis current (step S3). Then, the process goes to step S7.

When the determination section 41a determines that dFT/dt has exceeded the threshold (step S2: yes), the flux weakening control module 42 obtains a desired motor rotational frequency ω from the mapping table of rotational frequency vs. torque characteristic (step S4). Next, the flux weakening control module 42 determines d-axis and q-axis currents that maximize the output of the electric motor 2 (step S5), and determines a value of a brake command Ft' (step S6) at the emergency braking. The value Ft' of the brake command at the emergency braking is greater than the value FT from the brake command device 40. Next, the value Ft' of the brake command at the emergency braking is converted into a current command, and then, in step S7, the motor driving control section 37 sends the current command to the PWM control section 34a. Then, this calculation process is ended.

According to the electric brake device described above, the controller 9 performs drive control on the electric motor 2 such that the brake pad 7 having a predetermined clearance from the brake rotor 6, is pressed against the brake rotor 6 when the value of the braking force command from the brake command device 40 increases. When the emergency braking detection module 41 detects an emergency braking request, the flux weakening control module 42 of the controller 9 applies a d-axis current to the electric motor 2 to perform flux weakening control, thereby increasing the rotational frequency of the electric motor 2 to enhance the followability to the braking force command.

In general, the appropriate pair of values of d-axis and q-axis currents differs according to which is emphasized, where or efficiency. In particular, in the case where an electric motor of a surface magnet type in which a permanent magnet is provided on the surface of the rotor, i.e., in the case of a so-called SPM, d-axis current fails to generate the torque, that is, d-axis current makes only copper loss. Thus, in the case where efficiency is emphasized, it is preferable that the value of the d-axis current is set to zero. In this embodiment, it is possible to control the motor current such that the maximum output is achieved only when the emergency braking detection module 41 detects an emergency braking request, thereby improving the responsiveness. If no emergency braking request is detected, the steady state control section 46 controls the motor current under the efficient current condition where the value of the d-axis current is made zero, whereby power consumption during steady operation can be reduced.

When the differential value of the input value from the brake command device 40 exceeds the threshold, the flux weakening control module 42 applies a d-axis current to the electric motor 2 to perform flux weakening control. Using the differential value allows compensation operation that applies a strong braking force when an emergency braking request is detected, even if the force applied on the brake pedal is insufficient, for example. When the deviation between the input value from the brake command device 40 and the estimated braking force value estimated by the braking force estimation module 43 becomes less than or equal to a certain value, the emergency braking request cancellation module 44 cancels the emergency braking request. Since the emergency braking request can be canceled without delay, power consumption during steady operation can be further reduced.

When the emergency braking request is detected, the flux weakening control module 42 uses a value of the command greater than the value of the command from the brake command device 40. By increasing the value of the command from the brake command device 40 when an emergency braking request is detected, a braking force larger than that in the steady state can be easily applied.

Other embodiments will be described. In the following description, the components corresponding to the matters described in the preceding embodiment are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and further, the embodiments may be partially combined unless such combinations cause any problem.

Figure 7:
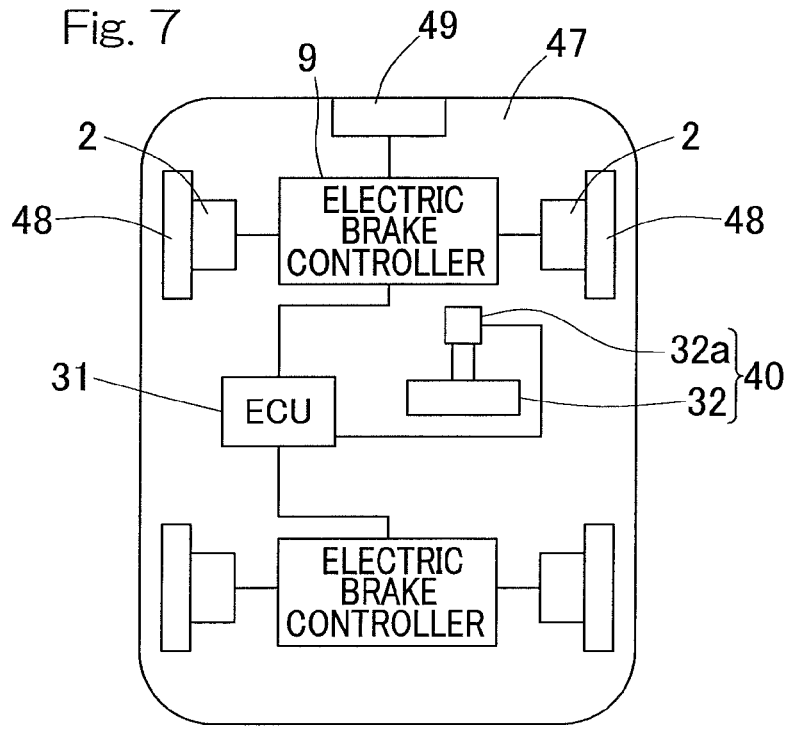
FIG. 7 is a schematic diagram showing an electric brake device according to another embodiment of the present invention, which is mounted in a vehicle.

FIG. 7 shows another embodiment in which, in addition to the configuration shown in FIG. 4, the vehicle 47 has a distance detection device 49 that detects the distance between the vehicle 47 and an obstacle outside the vehicle. The distance detection device 49 may include a millimeter wave radar and a camera. In this case, the emergency braking detection module 41 (FIG. 3) detects an emergency braking request based on the distance between the vehicle and the obstacle detected by the distance detection device 49, or based on the differential value of the distance. For example, in a state where the relative distance between the vehicle 47 and the obstacle or the differential value of the distance becomes less than or equal to a certain value, when the brake command device 40 sends a braking force command to the controller 9, an emergency braking state can be determined.

Figure 8:
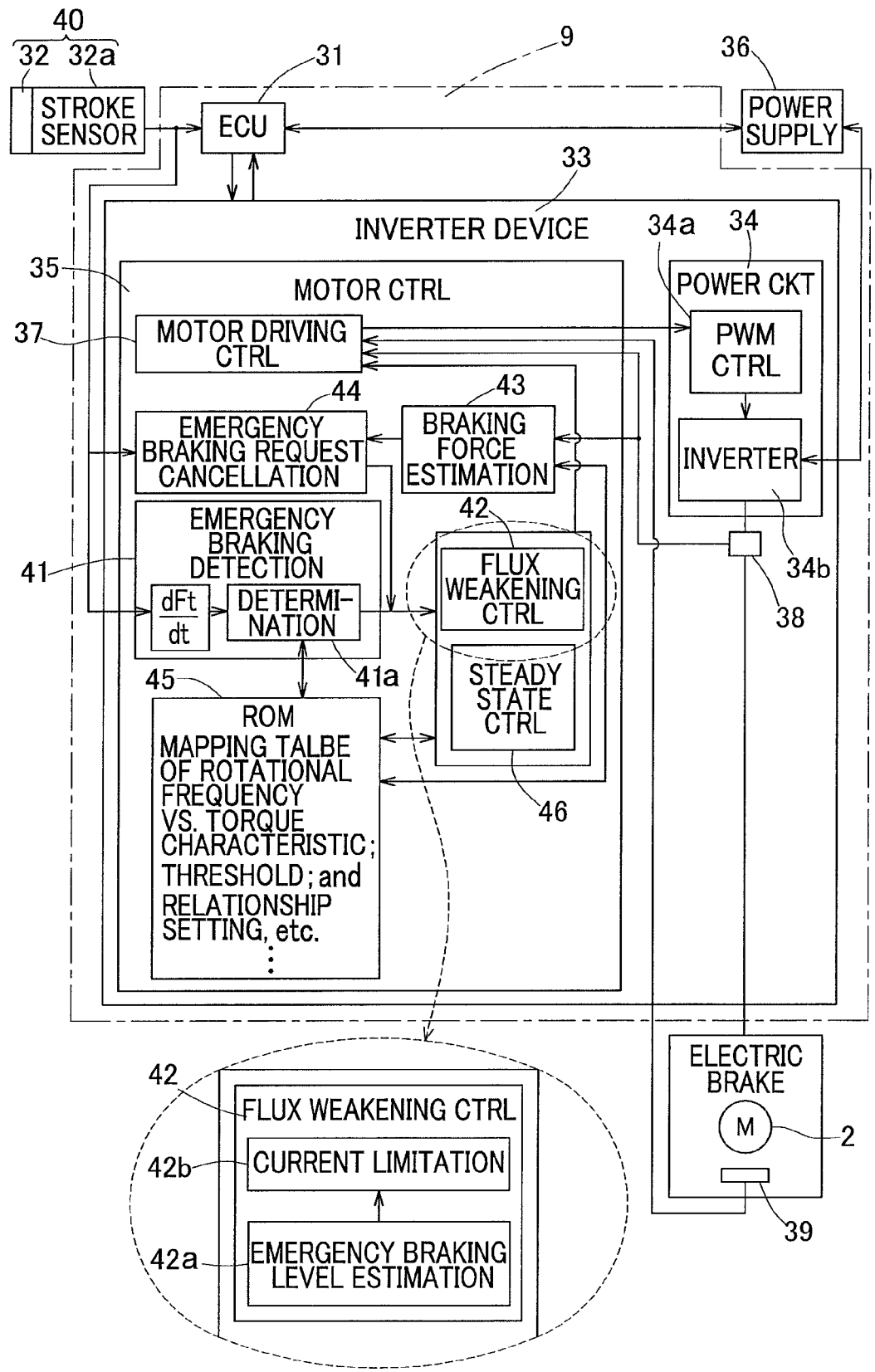
FIG. 8 is a block diagram of a control system of an electric brake device according to still another embodiment of the present invention.

As a still another embodiment, as shown in FIG. 8, the flux weakening control module 42 may have an emergency braking level estimation section 42a and a current limitation section 42b. The emergency braking level estimation section 42a estimates the level of the emergency when an emergency braking request is detected. For example, the emergency braking level estimation section 42a estimates the level of the emergency, based on the speed of operating the brake pedal 32, that is, the differential value dFT/dt of the stroke amount measured by the stroke sensor 32a. If the differential value dFT/dt exceeds a threshold and becomes greater than the threshold, the higher the level of the emergency is estimated.

The current limitation section 42b determines an upper limit value for the d-axis current to be used in the flux weakening control, depending on the estimated level of the emergency For example, the higher the estimated level of the emergency, the higher the upper limit value for the d-axis current is determined. In this manner, by determining the upper limit value for the d-axis current to be used in the flux weakening control depending on the level of the emergency braking state, it is possible to finely control the output of the electric motor 2.

Figure 9:
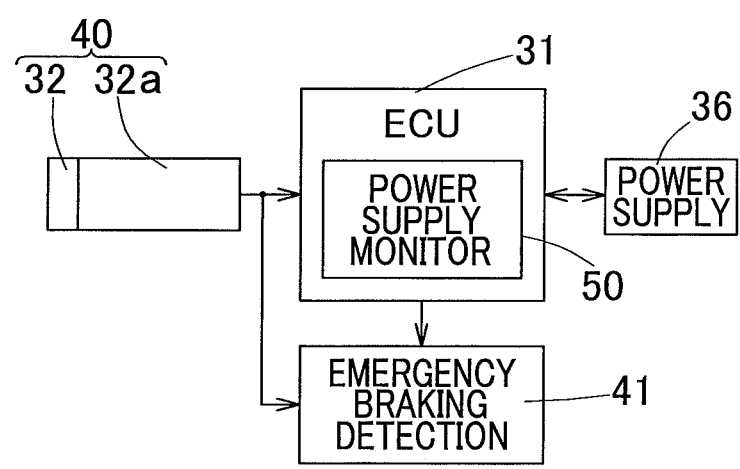
FIG. 9 is a block diagram of a control system of an electric brake device according to still another embodiment of the present invention.

As a still another embodiment, as schematically shown in FIG. 9, for example, the ECU 31 may include a power supply monitoring section 50 that measures the remaining amount of the power of the power supply 36. The flux weakening control module 42 (FIG. 3) may limit the d-axis current to be used in the flux weakening control when the power remaining amount measured by the power supply monitoring section 50 becomes less than or equal to a threshold. By limiting the d-axis current to be used in the flux weakening control under the condition where the power remaining amount of the power supply 36 is less than or equal to the threshold, that is, just before the power supply is exhausted, it is possible to delay further consumption of the power supply 36. The power supply monitoring section 50 may be provided in any component other than the ECU.

In the embodiments above, an emergency braking request is detected based on comparison between the differential value of the input value from the brake command device 40 and a threshold. However, the present invention is not limited to this example. A threshold may be set for the input value from the brake command device 40, and the emergency braking detection module 41 may detect an emergency braking request through comparison between the input value and the threshold. A threshold may be set for the deviation between the input value from the brake command device 40 and the estimated braking force value estimated by the braking force estimation module 43, and the emergency braking detection module 41 may detect an emergency braking request through comparison between the deviation and the respective threshold therefor. Alternatively, an emergency braking request may be detected through comparison between a differential value of the deviation and a respective threshold therefor.

When an emergency braking request is detected, the flux weakening control module 42 may temporarily make greater the upper limit value for the current to be applied to the electric motor 2, than that in the steady state where the emergency braking request is not detected. In this case, a braking force larger than that in the steady state can be applied at the time of an emergency braking request, and thus, the braking distance can be shortened. As a method for controlling the actual braking force, the vehicle may include a load sensor that detects the braking force by means of load and feedback control of the load detected by the load sensor may be used.

The electric motor may be an IPM (Interior Permanent Magnet Motor) in which a magnet is embedded in the rotor. In the IPM, a d-axis current may be determined so as to maximize a torque including a reluctance torque. In this case, the d-axis current is determined in consideration of the reluctance torque caused by magnetization of the rotor and the torque caused by magnetization of the magnet inside the rotor, and thus, the output of the electric motor can be further finely controlled. The electric motor may be a surface magnet brushless DC motor.

In the embodiments, the electric brake device is applied to a disc brake. However, the application is not limited to application to a disc brake only. The electric brake device may be applied to a drum brake.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

2 . . . electric motor
4 . . . linear motion mechanism
6 . . . brake rotor
7 . . . brake pad
9 . . . controller
36 . . . power supply
40 . . . brake command device
41 . . . emergency braking detection module
42 . . . flux weakening control module
42a . . . emergency braking level estimation section
42b . . . current limitation section
43 . . . braking force estimation module
44 . . . emergency braking request cancellation module
46 . . . steady state control section
49 . . . distance detection device
50 . . . power supply monitoring section

What is claimed is:

1. An electric brake device comprising:
a brake rotor;
a brake pad;
an electric motor;
a linear motion mechanism configured to convert a rotary motion of the electric motor into a linear motion that is transmitted to the brake pad;
a controller configured to control the electric motor; and
a brake command device configured to send a braking force command to the controller,
wherein the controller includes
an emergency braking detection module configured to detect an emergency braking request;
a steady state control section configured to perform braking in a steady state; and
a flux weakening control module configured to perform flux weakening control, the flux weakening control being performed when the emergency braking detection module detects an emergency braking request,
wherein the flux weakening control module includes
an emergency braking level estimation section configured to estimate a level of an emergency braking state, the level being estimated when the emergency braking request is detected; and
a current limitation section configured to determine an upper limit value for a d-axis current to be used in the flux weakening control, depending on the level of the emergency braking state estimated by the emergency braking level estimation section.

2. The electric brake device as claimed in claim 1, further comprising:
a braking force estimation module configured to estimate the braking force, wherein respective threshold(s) is/are determined for at least one of: an input value from the brake command device; a differential value of the input value; a deviation between the input value from the brake command device and the braking force estimated by the braking force estimation module; and a differential value of the deviation, and the emergency braking detection module detects the emergency braking request through comparison between the value and the respective threshold therefor.

3. The electric brake device as claimed in claim 1, wherein a vehicle having the electric brake device mounted therein includes a distance detection device configured to detect a distance between the vehicle and an obstacle outside the vehicle, and the emergency braking detection module detects the emergency braking request based on the distance detected by the distance detection device or a differential value of the distance.

4. The electric brake device as claimed in claim 1, further comprising:

a braking force estimation module configured to estimate the braking force, wherein the controller includes an emergency braking request cancellation module configured to cancel the emergency braking request, the emergency braking request being cancelled when a deviation between an input value from the brake command device and the braking force estimated by the braking force estimation module becomes less than or equal to a certain value.

5. The electric brake device as claimed in claim 1, wherein when the emergency braking request is detected, the flux weakening control module temporarily makes greater an upper limit value for a current to be applied to the electric motor, than that in the steady state where no emergency braking request is detected.

6. The electric brake device as claimed in claim 1, wherein when the emergency braking request is detected, the flux weakening control module determines a value of the command for emergency braking so as to be greater than a value of the command from the brake command device.

7. The electric brake device as claimed in claim 1, wherein the electric motor is a surface permanent magnet brushless DC motor.

8. An electric brake device comprising:

a brake rotor;

a brake pad;

an electric motor;

a linear motion mechanism configured to convert a rotary motion of the electric motor into a linear motion that is transmitted to the brake pad;

a controller configured to control the electric motor; and a brake command device configured to send a braking force command to the controller, wherein the controller includes an emergency braking detection module configured to detect an emergency braking request;

a steady state control section configured to perform braking in a steady state;

a flux weakening control module configured to perform flux weakening control, the flux weakening control being performed when the emergency braking detection module detects an emergency braking request; and a power supply monitoring section configured to measure a remaining amount of power of a power supply that drives the electric motor, wherein the flux weakening control module limits a d-axis current to be used in the flux weakening control when the remaining amount of power measured by the power supply monitoring section becomes less than or equal to a threshold.

* * * * *